(12) United States Patent
Pyle

(10) Patent No.: US 9,502,896 B2
(45) Date of Patent: Nov. 22, 2016

(54) SYSTEMS AND METHODS FOR THE TIMED POWER UP OF ELECTRONIC DEVICES

(71) Applicant: Monolith Amalgamation LLC, San Antonio, TX (US)

(72) Inventor: James M. Pyle, San Antonio, TX (US)

(73) Assignee: Monolith Amalgamation LLC, San Antonio, TX (US)

( * ) Notice: Subject to any disclaimer, the term of this patent is extended or adjusted under 35 U.S.C. 154(b) by 853 days.

(21) Appl. No.: 13/656,686

(22) Filed: Oct. 20, 2012

(65) Prior Publication Data

US 2013/0200704 A1 Aug. 8, 2013

Related U.S. Application Data

(60) Provisional application No. 61/632,944, filed on Feb. 3, 2012.

(51) Int. Cl.
| | |
|---|---|
| *H02J 3/14* | (2006.01) |
| *H02J 1/00* | (2006.01) |
| *H02J 3/00* | (2006.01) |
| *H01R 13/70* | (2006.01) |
| *H01R 13/713* | (2006.01) |
| *H01R 25/00* | (2006.01) |
| *G04C 23/44* | (2006.01) |
| *G04G 15/00* | (2006.01) |

(52) U.S. Cl.
CPC ............... *H02J 3/00* (2013.01); *G04C 23/44* (2013.01); *G04G 15/006* (2013.01); *H01R 13/70* (2013.01); *H01R 13/713* (2013.01); *H01R 25/003* (2013.01); *Y10T 307/406* (2015.04)

(58) Field of Classification Search
CPC .. H03K 17/22; H05B 37/036; H05B 39/105; H01K 1/625; H01K 1/70; H01J 9/00; H01H 47/00; H02J 3/00

USPC .............. 307/36, 39, 38, 66, 64, 112, 115; 340/3.1; 700/284, 286
See application file for complete search history.

(56) References Cited

U.S. PATENT DOCUMENTS

| | | |
|---|---|---|
| 5,454,114 A | 9/1995 | Yach et al. |
| 5,968,178 A | 10/1999 | Williams et al. |
| 6,476,523 B1 | 11/2002 | Lee |

(Continued)

*Primary Examiner* — Rexford Barnie
*Assistant Examiner* — Jagdeep Dhillon
(74) *Attorney, Agent, or Firm* — Kammer Browning PLLC

(57) ABSTRACT

A power re-set device that includes two or more solid state switched outlet circuits and two or more timer delay circuits. The circuits are housed within a power outlet enclosure and allow the user to connect a modem, a router, and a computer to direct their sequential activation on a time delayed basis. The system includes displays and timer set buttons to program timed delays into the system for activation of specific switched outlet circuits. The device includes connection to an AC power outlet through a surge protection circuit. The system includes a manual power cycle button that allows the user to re-set the entire system through a single action. The user may program the system to sequentially activate the electronic devices in a manner that allows boot up of the devices in an order that accommodates the interconnections between the devices, such as through a network. Operation of the system includes programming the device to delay activation of a modem and then to delay activation of a router within the system. Thereafter, a further time delay may be implemented before a computer within the system is powered up. The device may monitor power and network signal condition.

16 Claims, 5 Drawing Sheets

(56) References Cited

U.S. PATENT DOCUMENTS

| | | |
|---|---|---|
| 6,583,588 B2 | 6/2003 | Erhardt |
| 6,816,483 B1 * | 11/2004 | Beckstrom ............... H04Q 3/62 370/356 |
| 6,892,315 B1 | 5/2005 | Williams |
| 6,903,284 B2 | 6/2005 | Dunfield et al. |
| 7,529,958 B2 | 5/2009 | Roth et al. |
| 7,898,115 B2 | 3/2011 | Meltzner |
| 7,977,825 B2 | 7/2011 | Gilbert |
| 2002/0057206 A1 * | 5/2002 | Reynolds ................. G06F 1/266 340/3.1 |
| 2002/0185918 A1 | 12/2002 | Lee et al. |
| 2005/0171646 A1 * | 8/2005 | Miller .................... A01G 25/16 700/284 |
| 2011/0012539 A1 | 1/2011 | Skwarlo |
| 2011/0043034 A1 | 2/2011 | Pien |
| 2012/0313454 A1 * | 12/2012 | Montena ................. H01R 13/70 307/115 |
| 2013/0049466 A1 * | 2/2013 | Adams .................... G06F 1/266 307/39 |

* cited by examiner

SYSTEMS AND METHODS FOR THE TIMED POWER UP OF ELECTRONIC DEVICES

CROSS REFERENCES TO RELATED APPLICATIONS

This application claims the benefit under Title 35 United States Code §119(e) of U.S. Provisional Application 61/632,944, filed Feb. 3, 2012, the full disclosure of which is incorporated herein by reference.

BACKGROUND OF THE INVENTION

1. Field of the Invention

The present invention relates generally to timed electrical power switching devices. The present invention relates more specifically to a programmable device for the timed sequential power up of a number of digital electronic devices that may be associated with access to a digital network.

2. Description of the Related Art

A typical home or small office computer installation will include not only one or more individual computers, but access to a network such as the Internet. This access is typically achieved through the use of a DSL or cable modem that connects to the network (the Internet) through ports provided by an Internet Service Provider (ISP). The DSL or cable modem makes the connection to the Internet and provides that connection to the various computers within the physical location of the access point. In most cases, there is an intermediate device between the modem and the computers, typically comprising a router, either a hard wired (Ethernet) router, or more frequently these days, a wireless router. The typical home or small office setup therefore includes one or more computers which connect to the Internet through a router and then through a modem.

Computer systems in general are sensitive to power fluctuations and power interruptions. Activating or re-activating any type of digital electronic device usually involves a boot-up process whereby components and operations within the device are incrementally activated in a manner that allows for the proper functioning of the device and its interaction with the network. Within an individual device, this activation process can be adequately controlled through the use of internal timers and microprocessor controls. Unfortunately, the simultaneous activation of a number of discrete computer or digital electronic devices will often result in the conflicting activation of components and operations in a manner that prevents the proper functioning of a system or network as a whole. It is not uncommon, for example, in a networked computer system such as described above, for all three devices within the home or small office network to be activated at the same time when power has been interrupted, either intentionally or unintentionally. If the computer is activated at the same time as the modem, it is not uncommon for the sequence of steps within the computer to look for an available Internet access port before the modem has fully booted up and provided such access. Add to this the boot up process for an independent router, and the computer is often left unable to access a network during its boot up in a manner that stops the overall process from continuing and prevents the system from being fully functional.

In addition to power fluctuations and interruptions, computer systems that are connected to networks are also sensitive to network signal interruptions. Even where a network signal is only momentarily interrupted (as, for example through a remote power interruption with the Internet Service Provider), the re-connection of the signal source does not automatically re-set the network connection through the modem and/or the router to the computer. It is not uncommon in circumstances where an Internet connection is interrupted from the Internet Service Provider (ISP) for the router and/or the modem to require a re-start. As with power interruptions, it is often necessary for the modem to carry out its boot up process before presenting the network signal to the router, and likewise for the router to carry out its boot up process before presenting a network signal to the computer.

Even within individual digital electronic devices, there is often the need for a time period of power off condition to all of the internal components in order to re-set the device and prepare it for a power up process. A typical instruction is to wait fifteen seconds, for example, after the power down of a computer, before activating power again, so as to allow for the internal systems of the computer to re-set and thereafter properly boot back up. Similar delay times are often recommended for activation of modems and routers with the occurrence of either an intentional or unintentional power interruption. When these delays are compounded by multiplying the number of digital devices that are trying to automatically power up at the same time, it is not surprising that the final result of a fully functional and Internet accessible computer is not easily achievable.

It would be desirable to have a manner of automatically starting or re-starting a computer network system involving computers, routers, and modems, in a manner that prevented the discrete boot up operations of one device from interfering or occurring before the necessary operations in another device. It would be desirable if such a system could be programmed for the start up wait times that would be appropriate for each of the different types of devices. It would be desirable if such a system could be implemented through a single intentional activation by the user, or could be automatically activated in the event of an unintentional power interruption condition.

While many computer systems, including laptops, personal computers, and the like, have power switches associated with them, most modems and routers do not. It is typically necessary to unplug modems and routers to power them down and then manually plug them back in to power them back up. While there are reasons for structuring modems and routers in this manner, this structural approach does create an additional problem for users that are attempting to incrementally activate the typical home or small office network system of modem to router to computer.

SUMMARY OF THE INVENTION

The present invention therefore provides a solution to the above described problem associated with the incremental and sequential activation of a number of digital electronic devices such as would be included in a home or small office networked system. The present invention provides a power re-set device that includes two or more solid state switched outlet circuits, as well as two or more corresponding timer delay circuits. These circuits, housed within a power outlet enclosure, allow the user to connect a modem, a router, and a computer in a manner that allows for their sequential activation on a time delayed basis. The system includes displays and timer set buttons that allow the user to program timed delays into the system for activation of specific switched outlet circuits. The device includes a connection to a standard AC power outlet and provides a surge protection circuit as is typical with computer and electronic power supply circuits. The system further includes a manual power cycle button that allows the user to re-set the entire system through a single manual activation step.

The user may program the system to sequentially activate the two or more electronic devices in a manner that allows appropriate boot up for each of the devices in order to accommodate the interconnections between the devices, such as through a network. Typical operation of the system includes programming the device to delay activation of a modem for fifteen seconds or more and then to provide a further delay of fifteen seconds or more before a router within the system is powered up. Thereafter, a further time delay may be implemented before the computer within the system is powered up. In this manner, the proper sequence of operations to activate and provide access to the Internet may be achieved with the result being a fully functional, Internet accessible, computer.

DETAILED DESCRIPTION OF THE PREFERRED EMBODIMENTS

Figure 1:
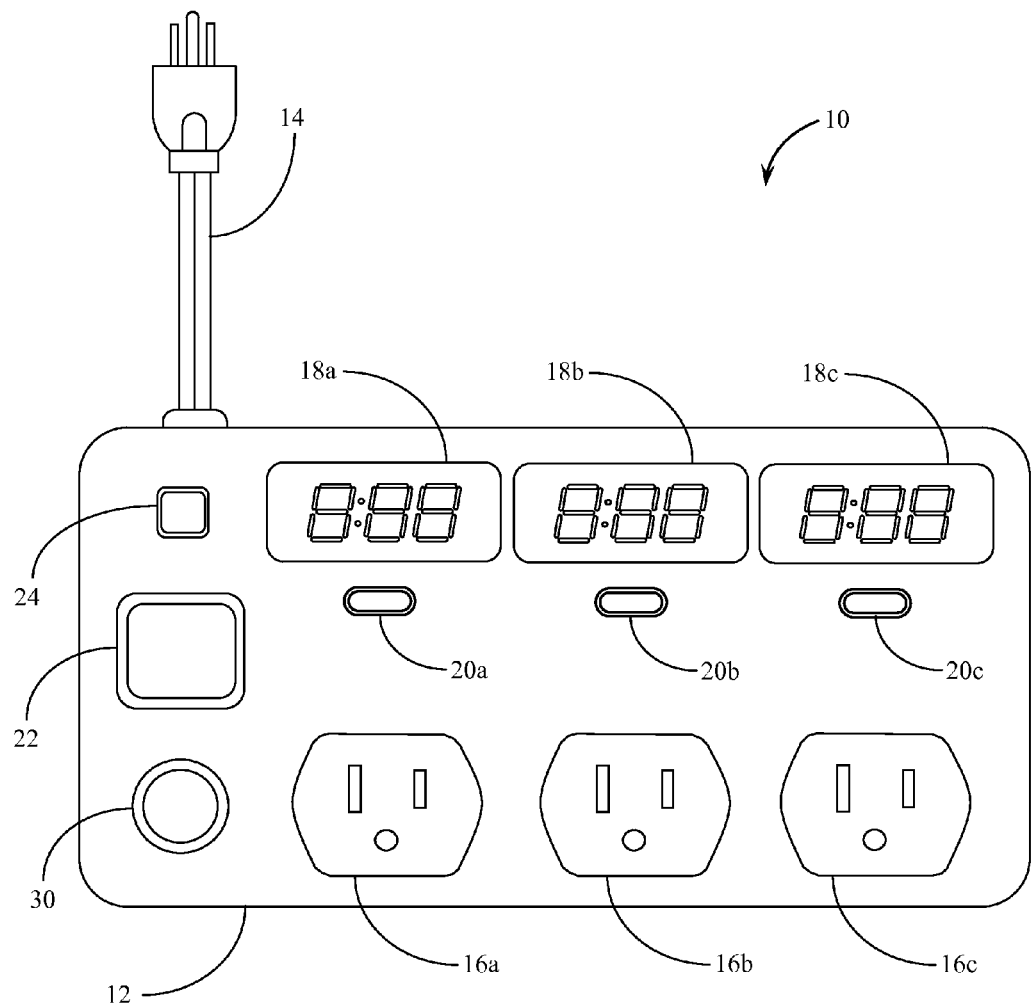
FIG. 1 is a top plan view of the basic configuration of the system of the present invention.

Reference is made first to FIG. 1 for a description of the basic structure of the system of the present invention. Re-set device 10 generally comprises device enclosure 12 which may take the form of one or more distinct functional and aesthetic shapes. The basic device enclosure must be of a size sufficient to provide power outlets as in the nature of a typical surge protector power strip device. Internal to the device (not seen in FIG. 1) are electronics that are generally small in size, including microprocessor or microcontroller circuits as described in more detail below. External to the device, as shown in FIG. 1, are AC power cord 14 as well as first, second, and third switched outlets 16a-16c. It is anticipated that the most common embodiment of the present invention will include three such switched outlets, although those skilled in computer hardware will recognize that as few as two switched outlets, and many more than three, may be appropriate. The embodiment shown in FIG. 1 may be the typical device structured for the modem/router/computer networked system of the typical home or small office.

Configured in association with switched outlets 16a-16c are first, second, and third timer displays 18a-18c. Associated with each of these timer displays are first, second, and third timer set buttons 20a-20c. A primary power cycle button 22 is also positioned on device enclosure 12 as is a power trip re-set button 24. Power cycle button 22 is intended to manually start or re-start the power up operation of the system. Trip re-set button 24 provides the typical surge protector re-set that is normally found on power strip surge protectors for computer equipment.

The structure of the device as shown in FIG. 1 is intended to allow for the easy connection of electrical power between an AC outlet and two or more digital electronic devices such as a modem, a router, and a computer. The spacing of the switched outlets 16a-16c would be such as to accommodate AC adapters as are typically used in conjunction with modems and routers. While each individual outlet may preferably be associated with a single timer circuit, it is anticipated that some timer circuits may be utilized to activate more than a single electronic device at a time. For example, the third switched outlet 16c may be associated with power to a computer device as well as to the display monitor associated with that device. Under such circumstances, a single timer circuit may be appropriate for activating power to both the computer and its associated display device. Other variations in the number of outlets associated with a given number of timer circuits are anticipated.

Figure 2:
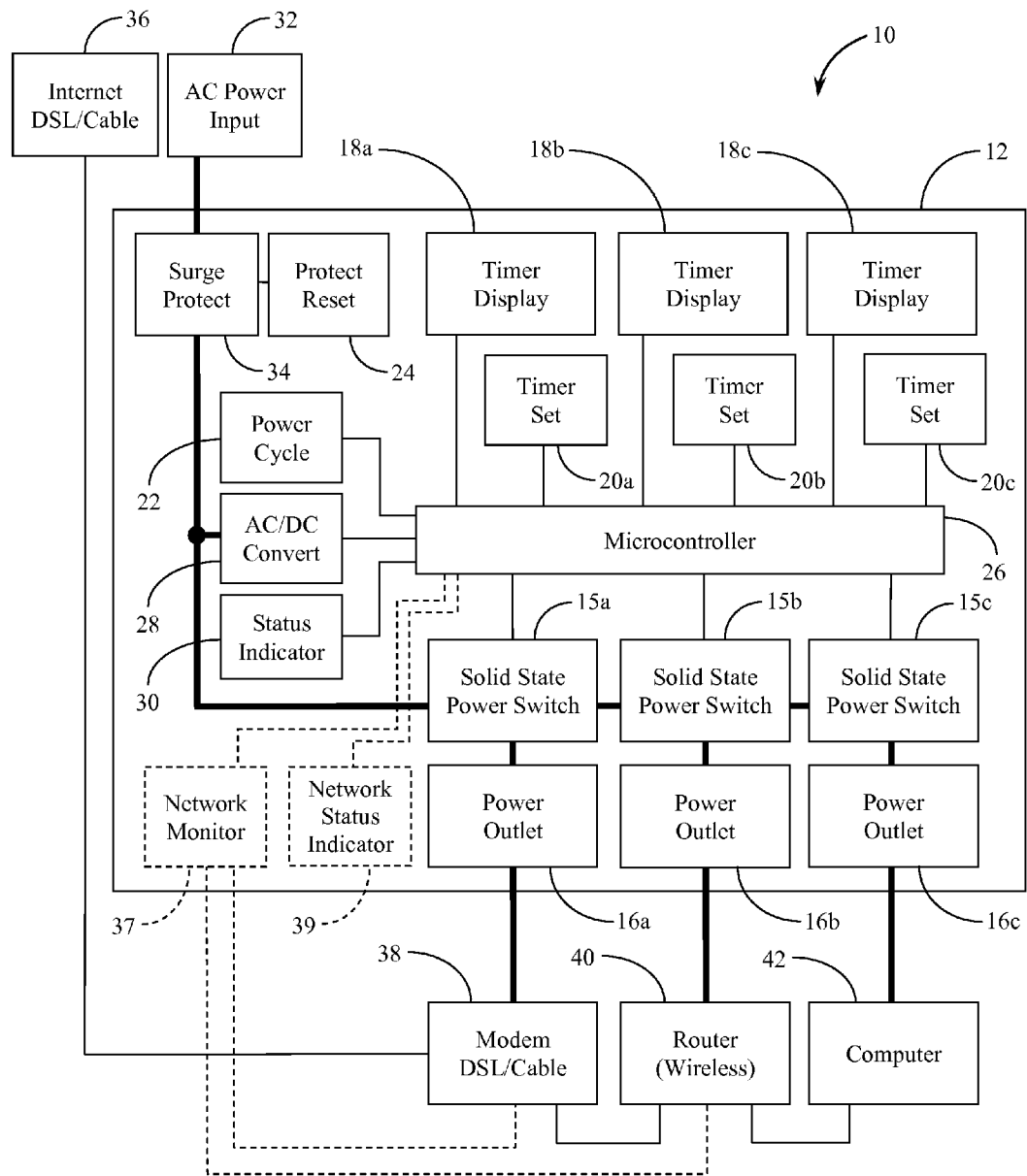
FIG. 2 is a schematic block diagram showing the electronic and electrical components associated with the overall system of the present invention.

Reference is next made to FIG. 2 which is a schematic block diagram showing electronic/electrical components of the system of the present invention. Re-set device 10 is again shown to include a number of electronic and electrical components positioned within device enclosure 12. The device itself is provided power by way of AC power cord 14 which is connected to an external AC power outlet (input) 32. Power from the device is provided through the two or more power outlets 16a-16c. In the example shown in FIG. 2, power outlet 16a provides switched power to a modem 38 (DSL or cable, for example), while switched power outlet 16b provides power to a router 40, either hardwired or wireless. Switched power outlet 16c provides power to a personal computer 42.

Modem 38 is connected to the network in the typical manner by way of Internet (DSL or cable) access port 36. In some cases, the Ethernet cable connecting Internet access port 36 with modem 38 may preferably pass through the device of the present invention in order to provide the same type of surge protection. Many such power strip surge protectors provide for this type of protection for either the cable or Internet connection or both. Such surge protection system circuits for the network access cable are parallel and ancillary to the systems of the present invention but may be incorporated to the same hardware structures.

Re-set device 10 of the present invention preferably includes microcontroller 26 which serves to carry out the functionality of the system as well as to retain timer set values for the system's operation, preferably even after a timer period of a power off condition. The basic operations of the system of the present invention may be achieved by relatively simple solid state microcontroller devices, while additional features described herein may involve onboard microprocessor type components to achieve a more versatile operation of the system, and in some instances to actually learn the optimal sequence and timing associated with a particular networked computer system.

Microcontroller 26 connects to and controls two or more solid state power switching devices 15a-15c. These power switching devices (such as a power MOSFET, an IGBT, or one of a number of transistor power switching devices) are sized and structured to accommodate the normal current and voltage constraints associated with the digital electronic devices operable within the computer network of the home or small office. Each of these power switching devices 15a-15c is connected to the external AC power input 32 through the surge protection device 34. Surge protection device 34 is, as described above, a surge protection circuit of the type typically associated with power strips and the like for computer systems. Surge protection device 34 may be re-set by trip re-set button 24 as described above. AC power input to the system is thereafter distributed not only to the solid state power switching devices 15a-15c, but also to AC/DC converter 28 which provides the necessary DC power to the electronic components within the system, including microcontroller 26 and the associated indicators and displays.

In addition to operating power switching devices 15a-15c, microcontroller 26 receives input from timer set buttons 20a-20c and in turn provides information to drive timer displays 18a-18c. The overall power cycle button switch 22 is also connected to microcontroller 26 as a manner of starting or re-starting the overall system. Various system status indicators 30 may also to be provided (and connected to microcontroller 26) to inform the user of the current power state of the overall system as being either inactive or active or in the process of re-starting.

The system as shown in FIG. 2 therefore allows the user to program the microcontroller 26 with timed delays through the use of timer set buttons 20a-20c while monitoring the time delay displayed on timer displays 18a-18c. Once programmed, the microcontroller 26 monitors the power into the system and the status of power cycle button switch 22 and, when called upon, sequentially activates solid state power switching devices 15a-15c in a timed manner so as to provide power output through power outlets 16a-16c and thereby to provide power to the respective components in the home or small office networked computer system. In this manner, modem 38 may be initially activated followed in a timed sequence by activation of router 40 and thereafter by activation of computer 42. Once again, the system may operate on an automated basis when an unintended power interruption occurs, or may be manually activated by the user by pressing power cycle switch 22.

Also shown in FIG. 2 are various optional components associated with an alternate preferred embodiment. These optional components represent additional functionality associated with monitoring the status of the network connection in addition to the power connection. Network monitor 37 is shown to be optionally connected to both modem 38 and router 40 at their output ports where the network signal would be presented under ordinary operation. Various mechanisms are known in the art for detecting the network signal at the device output, and/or utilizing one or more of the multiple outputs from the device for this purpose. Network monitor 37 is a digital component that signals microcontroller 26 when an interruption occurs in the output of the network signal from either modem 38 or router 40. In addition, network status indicator 39 is provided to receive a signal from microcontroller 36 to indicate to the user when a network signal interruption has occurred. As described in more detail below, this connection of network monitor 37 to both modem 38 and router 40 allows for the re-boot of only such device as is necessary to re-establish the full network signal path through to computer 42.

Figure 3:
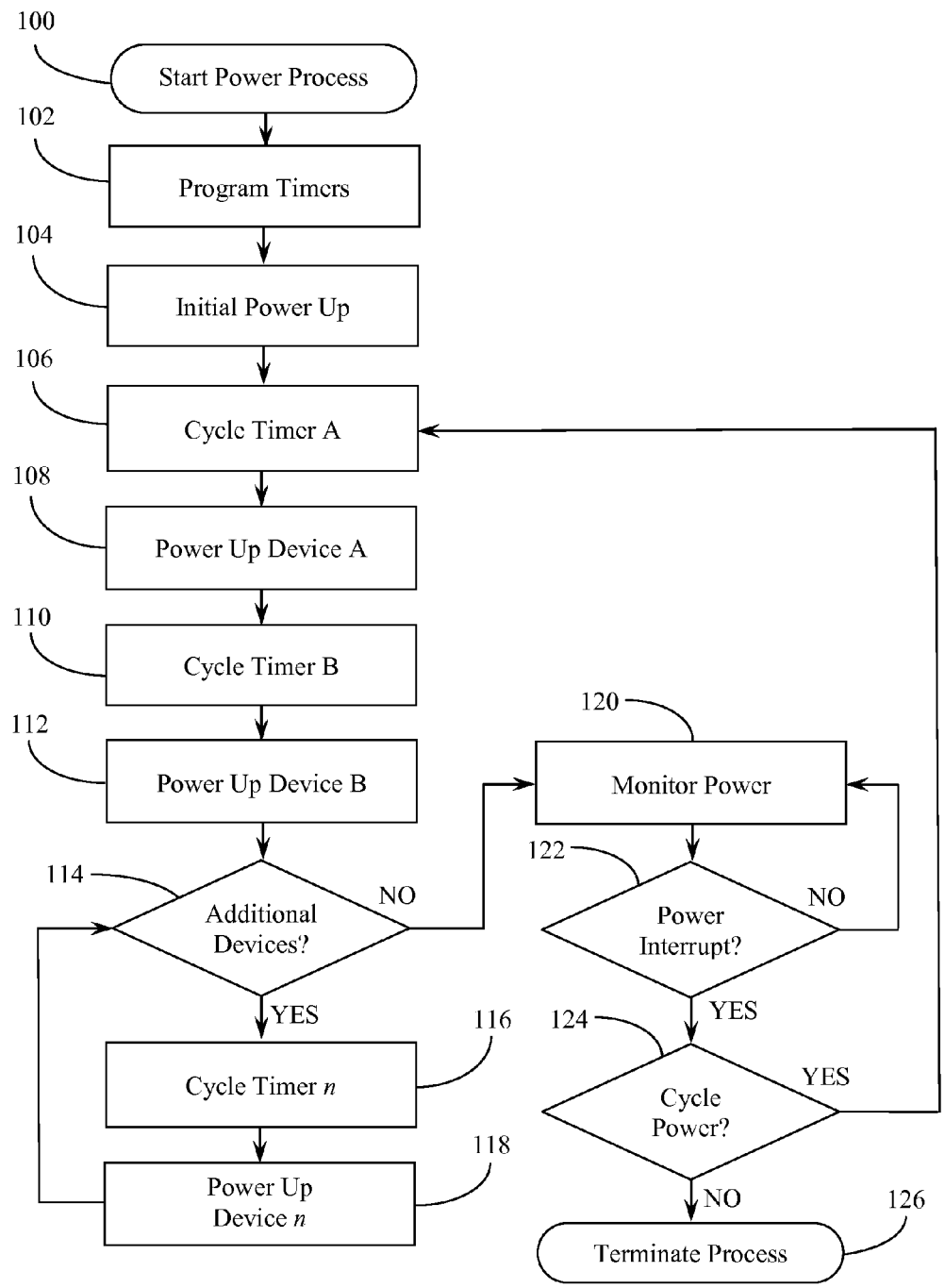
FIG. 3 is a flowchart showing the sequential operation of the method of the present invention.

Reference is next made to FIG. 3 for a description of the basic method steps associated with operation of the system of the present invention. The start of the overall process at Step 100 shown in FIG. 3, begins with the process of programming the timers through Step 102. Each timer may be independently programmed according to the various devices utilized by the user, and/or may have a default setting such as a fifteen second start up of the modem, followed by a sixty second start up of the router, followed by a sixty second start up of the computer. Variations on the default settings may, of course, accommodate specific modem, router, and computer requirements.

After the timers have been programmed, initial power up of the system is made at Step 104. Step 106 involves the cycling of timer A, which in the example described above, would involve a power up of the DSL or cable modem. As indicated above, the typical delay on power interruption for activating a modem may be fifteen seconds or more. Cycling timer A for fifteen seconds therefore delays the power up of device A at Step 108 for an appropriate period of time. Thereafter, at Step 110, timer B is cycled before the power up of device B at Step 112 occurs.

The system then queries whether there are additional devices to be powered up depending upon the structure of the networked computer system being utilized. This query at Step 114 may result in directing the process to the monitor power Step 120 or may involve a further timer cycling at Step 116. As indicated above, the typical arrangement of the system of the present invention may include three timers, although the total number is not limited and may involve any (n) number of timers and switched power circuits. Step 116, therefore, involves cycling timer (n) followed by Step 118 where device (n) is powered up. If at query Step 114 no additional devices are programmed into the system, then the process proceeds to the monitor power Step 120. In this monitoring power step, the system continuously queries whether there is a power interruption at query Step 122. If not, the process returns to the monitor power Step 120.

If there is a power interruption, then the process proceeds to a query Step 124 which determines whether the power interruption is intended to be a power off instruction or a direction to cycle power to the system. If the instruction at query Step 124 is to cycle the power, then the process returns to Step 106 and carries out the sequential timed power up activation of the various devices as carried out initially and according to the programmed timers. If the instruction at query Step 124 is to power down the system, then the process ends at termination Step 126.

As described above, an object of the present invention is to allow the user to carry out the single step activation of an automated process that in turn carries out the timed sequential power up of two or more electronic devices. The controls within the system are intended to be simple and easily operable by the user without the need for the user's constant and repetitive attention to the individual power circuits associated with the devices within the networked computer system. While more complex systems might include circuits for detecting the boot up status of the various electronic devices, such complexities would generally increase the cost of manufacture and the expense to the user for the basic re-set device.

In addition, the basic system of the present invention anticipates the ongoing connection of the network through the devices described. In some instances, and within some networked computer systems, it may be desirable to monitor the status of the network itself and to delay activation of the various devices by not powering up until the condition of the network is such as to properly accommodate the power up operation. Variations in the methodology associated with the present invention may be anticipated through the use of monitoring circuits connected both to the network access port and to the individual devices associated with distributing the network to the computers within the overall system. In its simplest form, however, the system and method of the present invention are intended to control the power up condition of each of the devices within the system and to anticipate the general condition whereby AC power has been restored to the system overall and network access is likewise made available.

Figure 4A:
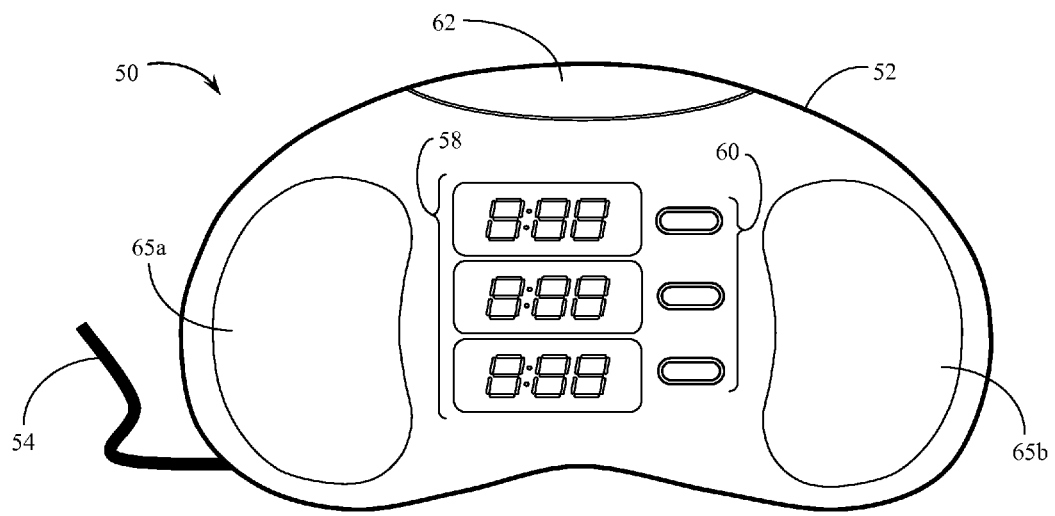
FIGS. 4A & 4B are top plan views of a number of alternate embodiments for the structure of the re-set device of the present invention.
Figure 4B:
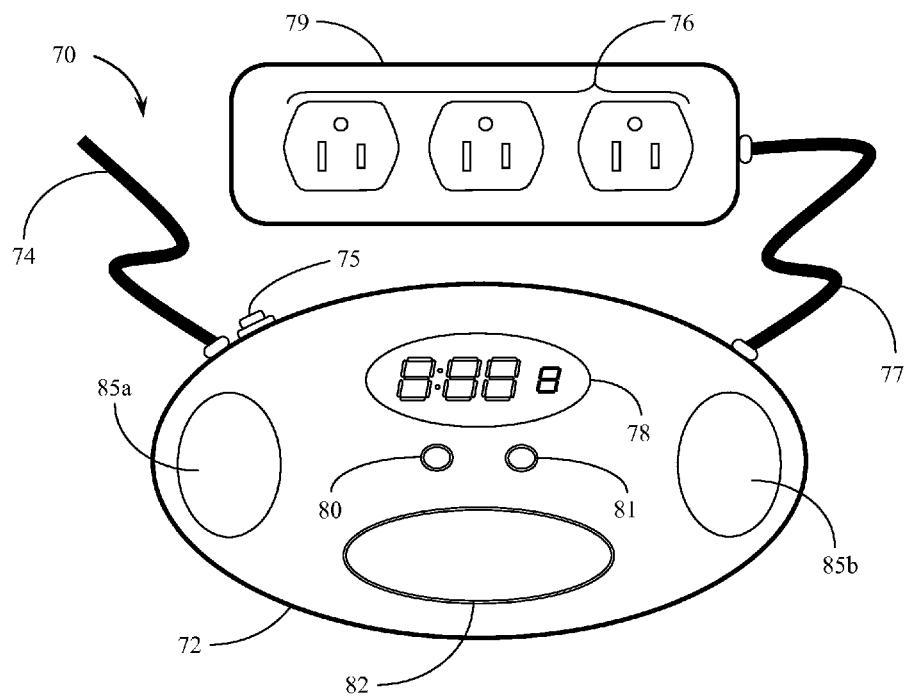

Reference is next made to FIGS. 4A & 4B for alternate structural embodiments of the present invention that provide suitable desktop configurations for implementation of the system. FIG. 4A represents a device that may be set on a desktop and provide easy access to the displays and activation buttons of the system. Re-set device 50 as shown in FIG. 4A may be configured with a device enclosure 52 that retains an AC power cord 54 in the manner shown. Timer displays 58 are represented to the user as are timer set buttons 60 in a manner that allows the user to readily identify the association of each timer circuit to a particular device. These displays may have pre-identified labels (such as "Modem", "Router", and "Computer") or may be independently configured by the user with circuits A, B, and C, as examples. It is also anticipated that in place of a number of discrete digital displays, the device may contain a single display that may be stepped through a representation of each of the two or more timer circuit values. In other words, a pair of activation buttons, for example, may operate a single display, stepping through each of the timer circuits in turn and setting or displaying the timer values for that specific circuit.

Power cycle button 62 in the embodiment shown in FIG. 4A may be a single large button such as the snooze activation bar on a clock radio or the like. Once programmed, therefore, the re-set device 50 in FIG. 4A may be structured to provide a single large re-set button activated by the user as necessary. With such a structure, it would be preferable to include status display devices 65a & 65b as means for immediately alerting the user as to the power condition of the system. As visual displays, status display devices 65a & 65b could, for example, be light elements that display red for a power fault condition, or a power off condition, and green for a power on condition. These light displays could blink green during the process of power up, or could blink red when an unintended power interruption has occurred. Various other display indicators, both visual and audible, are anticipated.

FIG. 4B is an alternate structural configuration for the system of the present invention providing re-set device 70, again incorporated within device enclosure 72. Whereas the power outlet plugs may be presented on the back side (not shown) of device 50 in FIG. 4A, a separate power strip is provided on re-set device 70 shown in FIG. 4B. In this manner the control components of the system may be positioned on the desktop apart from the power outlet components which may be positioned on the floor or at a distance from device enclosure 72. Re-set device 70 as shown in FIG. 4B also includes an AC power cord 74 which may preferably connect to device enclosure 72 as the embodiment described above, or may connect directly to outlet extension 79 where the switched power outlets are positioned.

In the example shown in FIG. 4B, however, outlet extension 79 is connected to device enclosure 72 by switched power cord 77. If AC power cord 74 is connected directly to outlet extension 79, then cord 77 may comprise only the digital signal lines required to operate the solid state power switching devices which may then be enclosed within outlet extension 79. In this manner, all of the high voltage, high current components in the system may be enclosed within outlet extension 79 with only the low voltage digital components structured within device enclosure 72. Surge protection re-set button 75 provides the functionality described above with the surge protector internal components of the device.

As in re-set device 50 shown in FIG. 4A, device enclosure 72 in FIG. 4B would include one or more timer displays 78 with the associated timer set buttons 80 & 81. A single large power cycle button 82 is also provided in the structure of the device shown in FIG. 4B. Status display elements 85a & 85b are also provided and would preferably function in the manner described above with respect to the embodiment shown in FIG. 4A.

Figure 5B:
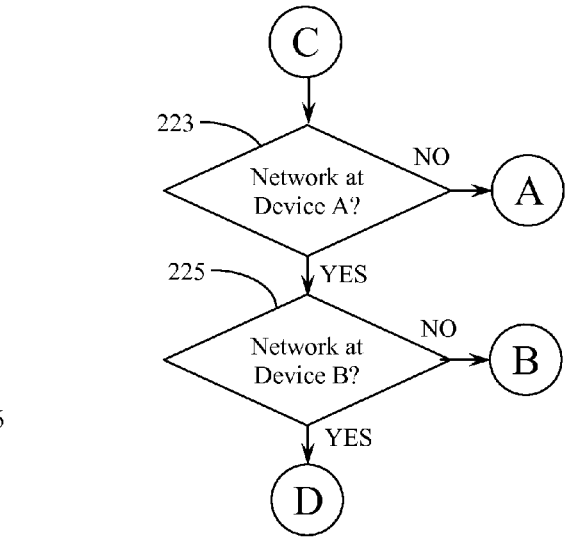
FIGS. 5A & 5B are flowcharts showing the sequential operation of an alternate method of the present invention, wherein both power and network signal monitoring is carried out.
Figure 5A:
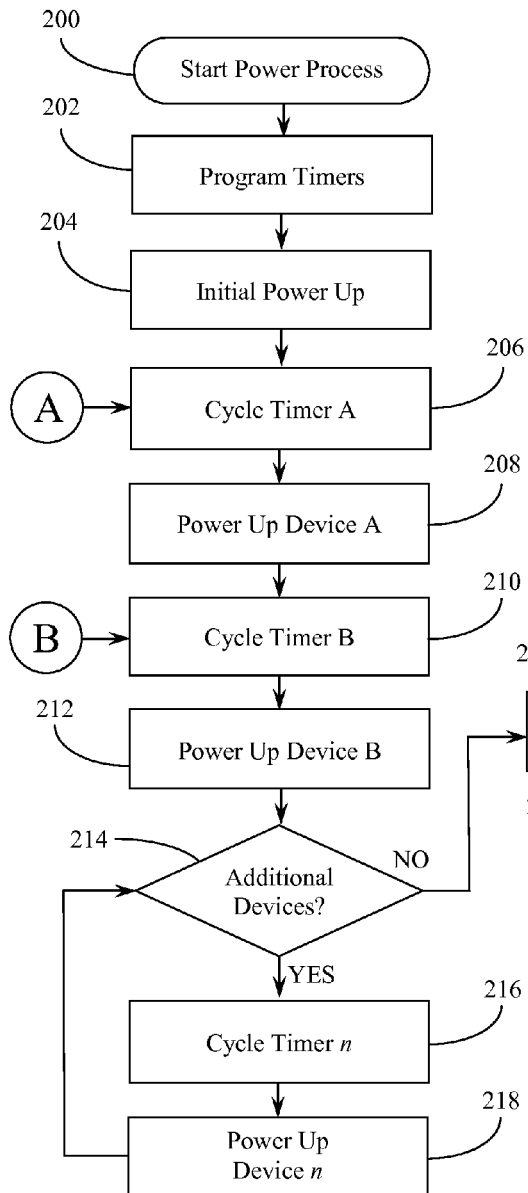

Reference is finally made to FIGS. 5A & 5B for a description of the method steps associated with an alternate preferred operation of the system of the present invention configured to monitor not only power, but also network signal status. Steps 200-218 in FIG. 5A duplicate the corresponding Steps 100-118 shown and described above in conjunction with FIG. 3. Once the programming of the device has been completed, the process proceeds to the monitor power and network Step 220 as shown. In this monitoring power and network Step 220, the system continuously queries whether there is first a network interruption at query Step 221. If there is a network interruption, the process proceeds to the network signal isolation subroutine shown in FIG. 5B. If there is not a network interruption, then the system queries whether there is a power interruption at query Step 222. If not, the process returns to the monitor power and network Step 220 through Connector D. If there is a network interruption detected, then the process proceeds to query Step 224 which determines whether the power interruption is intended to be a power off instruction or a direction to cycle power to the system. If the direction at query Step 224 is to cycle the power, then the process is directed to Step 206 (by way of Connector A) and carries out the sequentially timed power up operation of the various devices as carried out initially and according to the programmed timers. If the instruction at query Step 124 is to power down the system (such as, by activating the power off button on the device), then the process ends at termination Step 226.

If a network interruption is detected at query Step 221, the process proceeds to the network signal isolation subroutine shown in FIG. 5B by way of Connector C. FIG. 5B presents this subroutine process at query Step 223, determining first whether or not the network signal is present at the output of device A. If not, the process returns to Step 206 (FIG. 5A) and carries out the sequentially timed up power activation of the various devices as carried out initially and according to the programmed timers. If the network signal is present at the output of device A, the process then proceeds to query Step 225, which determines whether or not the network signal is present at the output of device B. If not, the process then directs to Step 210 and carries out the sequentially timed power up activation of the system starting with device B rather than device A. If the network signal appears active at the outputs of both device A and device B, the process simply returns to Step 220 for the ongoing monitoring of the power and the network signal by way of Connector D.

Although the present invention has been described in conjunction with a number of preferred embodiments and various modifications to those embodiments have been described, those skilled in the art will recognize further modifications and variations in both the structure and function of the system that still fall within the spirit and scope of the invention. Once again, variations in the placement and positioning of the various electronic and electrical components within the system may provide a preferable structure for different desktop or book shelf environments for placement of the various electronic components controlled by the system. In addition, while the system has been described in conjunction with the typical arrangement whereby Internet access and power access are arranged as inputs into the components within the system, variations with both the power configuration (AC voltage, for example) and the manner of network connectivity (T1 Line, for example) are anticipated. Wide variations in the nature of control switches (the activation and re-set buttons) are further anticipated, as are variations in the manner of displaying the circuit status through visual and audible indicators to the user. Such variations do not necessarily depart from the spirit and scope of the invention which is defined more specifically by the independent claims that follow.

I claim:

1. A system for sequentially providing power to a plurality of electronic devices, the plurality of electronic devices comprising a digital network modem, a network router, and a personal computer, the system comprising:
   a solid state switched power circuit comprising an AC power input, a plurality of solid state power switches, and a plurality of switched AC power outlets connected to the plurality of electronic devices;
   at least one timer circuit connected to the plurality of solid state power switches;
   one or more timer set devices associated with the at least one timer circuit;
   one or more timer display devices associated with the at least one timer circuit;
   a network monitor circuit connecting the digital network modem and the at least one timer circuit, the network monitor circuit providing a first network status signal indicating an active network through the modem; and
   a power cycle switch;
   wherein the modem is connected to a switched AC power outlet operated by a first solid state power switch and controlled by the at least one timer circuit, the router is connected to a second switched AC power outlet operated by a second solid state power switch and controlled by the at least one timer circuit, and the personal computer is connected to a third switched AC power outlet operated by a third solid state power switch and controlled by the at least one timer circuit.

2. The system of claim 1 wherein the at least one timer circuit provides separate time delayed activation of each of the plurality of solid state power switches.

3. The system of claim 2 wherein the one or more timer set devices operate to set time periods in the at least one timer circuit for separate time delayed activation of each of the plurality of solid state power switches.

4. The system of claim 3 wherein the one or more timer display devices operate to display the time periods set in the at least one timer circuit by the one or more timer set devices.

5. The system of claim 1 wherein the at least one timer circuit comprises a microcontroller having control outputs associated with each of the plurality of solid state power switches, control inputs associated with each of the one or more timer set devices, and data outputs associated with each of the one or more timer display devices.

6. The system of claim 5 wherein the microcontroller further comprises a control input associated with the power cycle switch.

7. The system of claim 5 wherein the one or more timer set devices comprises a plurality of timer set devices, each timer set device connected to a separate control input of the microcontroller.

8. The system of claim 5 wherein the one or more timer set devices comprises one timer set device connected to a control input of the microcontroller.

9. The system of claim 5 wherein the one or more timer display devices comprises a plurality of timer display devices, each timer display device connected to a separate data output of the microcontroller.

10. The system of claim 5 wherein the or more timer display devices comprises one timer display device connected to data output of the microcontroller.

11. The system of claim 1 wherein the at least one timer circuit provides separate time delayed activation of the first; second, and third solid state power switches.

12. The system of claim 1 wherein the one or more timer set devices set first, second, and third time periods in the timer circuit for separate time delayed activation of the first, second, and third solid state power switches respectively.

13. The system of claim 1 wherein the power cycle switch comprises a momentary switch that upon activation, signals the at least one time circuit to turn off each of the plurality of solid state power switches and time sequentially turn on each of the plurality of solid state power switches.

14. The system of claim 1 further comprising a power interrupt detection circuit connected in parallel with the power cycle switch that upon detection of a power interruption, signals the at least one timer circuit to turn off each of the plurality of solid state power switches and time sequentially turn on each of the plurality of solid slate power switches.

15. The system of claim 1 wherein the network monitor circuit further connects the network router and the at least one timer circuit, the network monitor circuit further providing a second network status signal indicating an active network through the router.

16. The system of claim 1 further comprising a system status indicator providing an audible and/or visual indication of the time sequential process of providing power to the plurality of electronic devices.

* * * * *